United States Patent [19]

Benazzi et al.

[11] Patent Number: 5,762,902
[45] Date of Patent: Jun. 9, 1998

[54] CATALYST COMPRISING A FAUJASITE TYPE ZEOLITE AND A TON TYPE ZEOLITE AND A PROCESS FOR THE HYDROCONVERSION OF HYDROCARBON PETROLEUM FEEDS

[75] Inventors: Eric Benazzi, Montesson; Samuel Mignard, Chatou; Nathalie George-Marchal, Paris; Slavik Kasztelan, Rueil Malmaison, all of France

[73] Assignee: Institut Francais du Petrole, France

[21] Appl. No.: 786,646

[22] Filed: Jan. 21, 1997

[30] Foreign Application Priority Data

Jan. 22, 1996 [FR] France ................... 96 00670

[51] Int. Cl.$^6$ .................. C01B 33/36; B01J 29/06
[52] U.S. Cl. .................. 423/700; 423/DIG. 21; 423/DIG. 35; 502/64; 502/66; 502/67; 502/68; 502/69; 502/79; 208/109; 208/110; 208/114; 208/111
[58] Field of Search .................. 423/700, DIG. 21, 423/DIG. 35; 502/64, 66, 67, 68, 69, 79; 208/109, 110, 111, 114

[56] References Cited

U.S. PATENT DOCUMENTS

| | | | |
|---|---|---|---|
| 4,581,341 | 4/1986 | Himpsl | 502/68 |
| 4,740,292 | 4/1988 | Chen et al. | 502/79 |
| 4,818,508 | 4/1989 | Flank et al. | 423/DIG. 21 |
| 5,023,066 | 6/1991 | Gimpel et al. | 423/DIG. 21 |
| 5,055,437 | 10/1991 | Herbst et al. | 502/67 |
| 5,393,410 | 2/1995 | Habib et al. | 502/79 |
| 5,686,374 | 11/1997 | Nakaoka | 502/313 |

FOREIGN PATENT DOCUMENTS

| | | |
|---|---|---|
| 0 065 400 | 11/1982 | European Pat. Off. . |
| 0 186 446 | 7/1986 | European Pat. Off. . |
| 0 288 363 | 10/1988 | European Pat. Off. . |
| 0 345 106 | 12/1989 | European Pat. Off. . |
| 91/17829 | 11/1991 | WIPO . |

*Primary Examiner*—Mark L. Bell
*Assistant Examiner*—Louis M. Troilo
*Attorney, Agent, or Firm*—Millen, White, Zelano & Branigan, P.C.

[57] ABSTRACT

The invention concerns a composition comprising at least one matrix, at least one faujasite type zeolite and at least one TON type zeolite. The TON type zeolite can be Nu-10, THETA-1, KZ-2, or ISI-1. The catalyst also contains at least one hydrogenating element from groups VIII and VI.

The catalyst is particularly for use for hydrocracking to maximize the yield of middle distillates (kerosine and gas oil).

15 Claims, No Drawings

CATALYST COMPRISING A FAUJASITE TYPE ZEOLITE AND A TON TYPE ZEOLITE AND A PROCESS FOR THE HYDROCONVERSION OF HYDROCARBON PETROLEUM FEEDS

The present invention concerns a composition comprising a zeolite of structural type TON and a zeolite of structural type faujasite, associated with a matrix which is normally amorphous or of low crystallinity, a catalyst containing said composition and at least one hydrogenating element, and its use in a hydroconversion process for heavy petroleum feeds.

Hydrocracking of heavy petroleum cuts is a very important refining process which can produce lighter fractions such as gasoline, jet fuel and light gas oils from excess heavy feeds which are of low value. The refiner seeks such processes to adapt production to demand. As with catalytic cracking, the importance of catalytic hydrocracking is to produce very good quality middle distillates, jet fuel and gas oils. In contrast, the gasoline produced has a much lower octane number than that from catalytic cracking.

The catalysts used for hydrocracking are all bifunctional, combining an acid function with a hydrogenating function. The acid function is provided by supports with large surface areas (generally 150 to 800 $m^2 \cdot g^{-1}$) with superficial acidity, such as halogenated aluminas (in particular chlorinated or fluorinated), combinations of boron and aluminium oxides, amorphous silica-aluminas and zeolites. The hydrogenating function is provided either by one or more metals from group VIII of the periodic classification of the elements, such as iron, cobalt, nickel, ruthenium, rhodium, palladium, osmium, iridium and platinum, or by combination with at least one metal from group VI of the periodic classification, such as molybdenum and tungsten with at least one group VIII metal.

The equilibrium between the acid and hydrogenating functions is the fundamental parameter which governs the activity and selectivity of the catalyst. A weak acid function and a strong hydrogenating function produces catalysts with low activity, which generally operate at a high temperature (greater than or equal to 390° C.), and at a low space velocity (the HSV expressed as the volume of feed to be treated per unit volume of catalyst per hour is generally less than or equal to 2) but they have very high selectivity for middle distillates. In contrast, a strong acid function and weak hydrogenating function produce very active catalysts which, however, have poor selectivity for middle distillates. The search for a suitable catalyst will thus be centred on a judicious choice of each of the functions to adjust the activity/selectivity couple of the catalyst.

Thus one of the main aims of hydrocracking is to have great flexibility on various levels: flexibility as regards the catalysts used, which provides flexibility in the feeds to be treated, and flexibility as regards the products obtained. One parameter which is easy to control is the acidity of the catalyst support.

The great majority of conventional catalytic hydrocracking catalysts are constituted by supports with low acidity, such as amorphous silica-aluminas. These systems are used to produce very high quality middle distillates, and base oils when the acidity is very low.

Amorphous silica-aluminas form low acidity supports. Many hydrocracking catalysts are based on silica-alumina combined either with a group VIII metal or, preferably when the heteroatomic poison concentration in the feed to be treated exceeds 0.5% by weight, in combination with sulphides of group VIB and VIII metals. These systems have very high selectivity for middle distillates and the products formed are of good quality. The least acid of such catalysts can also produce lubricant stock. The disadvantage of all these systems based on an amorphous support is, as has already been stated, their low activity.

Catalysts comprising a Y zeolite of structural type FAU in themselves have a higher catalytic activity than that of amorphous silica-aluminas, but have higher selectivities for lighter products.

Our research on a number of zeolites and crystalline microporous solids have led us to the discovery that, surprisingly, a catalyst containing at least one zeolite of structural type TON selected from the group formed by THETA-1, Nu-10, KZ-2 and ISI-2 zeolites, associated with a Y zeolite of structural type FAU can produce a significantly improved selectivity for middle distillates with respect to known prior art catalysts.

More precisely, the invention provides a composition comprising at least one matrix, at least one faujasite type zeolite and at least one TON type zeolite selected from the group formed by THETA-1, Nu-10, KZ-2, or ISI-1 zeolites. The composition may act as a support. Catalytic elements can be added, such as hydrogenating element(s), to obtain a catalyst. It can also have a catalytic function of itself for certain reactions without the need for the addition of other elements.

The TON zeolite used in the present invention has a known structure. The synthesis of Nu-10 zeolite is described, for example, in European patent EP-A-0 065 400. Preferably, a TON type zeolite is used which is at least partially in its acid form (preferably completely in its H form) or partially exchanged with metal cations, for example cations of alkaline-earth metals.

The composition of the present invention also includes a Y zeolite with a faujasite structure (Zeolite Molecular Sieves, Chemistry and Uses, D W BRECK, J WILEY and Sons, 1973). Of the Y zeolites which are suitable, a stabilised Y zeolite is preferred which is commonly known as ultrastable or USY, either in its at least partially exchanged form with metal cations, for example cations of alkaline-earth metals and/or cations of rare earth metals with atomic number 57 to 71 inclusive, or in its hydrogen form.

An HY acidic zeolite is particularly advantageous and is characterised by different specifications: a $SiO_2/Al_2O_3$ molar ratio in the range about 8 to 70, preferably about 12 to 40; a sodium content of less than 0.15% by weight determined using the zeolite which has been calcined at 1100° C.; a unit cell crystal parameter in the range $24.55 \times 10^{-10}$ m to $24.24 \times 10^{-10}$ m, preferably in the range $24.38 \times 10^{-10}$ m to $24.26 \times 10^{-10}$ m; a sodium ion take-up capacity, CNa, expressed in grams of Na per 100 grams of modified zeolite, neutralised then calcined, of more than about 0.85; a specific surface area, determined by the B.E.T method, of more than about 400 $m^2/g$, preferably more than 550 $m^2/g$; a water vapour adsorption capacity of more than about 6% for a partial pressure of 2.6 torrs (i.e., 34.6 MPa) at 25° C.; a pore distribution in the range 1% to 20%, preferably in the range 3% to 15% of the pore volume contained in pores with a diameter in the range $20 \times 10^{-10}$ m and $80 \times 10^{-10}$ m, the remainder of the pore volume being contained in pores with a diameter of less than $20 \times 10^{-10}$ m.

The composition of the present invention also contains at least one matrix which is normally amorphous or of low crystallinity selected, for example, from the group formed by alumina, silica, magnesia, clays, titanium oxide, boron oxide, zirconia, aluminium, titanium or zirconium phosphates, and mixtures of at least two of these compounds, for example alumina-boron oxide combinations. The matrix is preferably selected from the group formed by silica, alumina, magnesia, silica-alumina combinations, silica-magnesia combinations and clay.

The composition of the present invention thus includes a matrix portion which is zeolitic and which ensures the acidic function, in the following proportions:

a) 10% to 99.9%, preferably 20% to 99.9%, and more preferably 29.9% to 99.8% by weight of at least one matrix;

b) 0.05% to 89.95%, preferably 0.05% to 79.95%, more preferably 0.1% to 69% by weight of at least one zeolite with structural type TON, in its hydrogen form and with the characteristics given above;

c) 0.05% to 89.95%, preferably 0.05% to 79.95% and more preferably 0.1% to 69% of at least one Y zeolite of structural type faujasite (FAU), in its hydrogen form, with the characteristics given above.

The composition of the present invention can be prepared using any of the methods known to the skilled person. Advantageously, it is obtained by mixing the matrix and zeolites then forming. The hydrogenating element is introduced during mixing, or after forming (preferred). Forming is followed by calcining; the hydrogenating element is introduced before or after calcining. In all cases, preparation is finished by calcining at a temperature of 250° C. to 600° C. One preferred method of the present invention consists of mixing the zeolite with structural type TON and the zeolite with structural type faujasite (FAU) in a wet alumina gel for a few tens of minutes, then passing the paste obtained through a die to form extrudates with a diameter which is in the range 0.4 to 4 mm.

The catalyst also has a hydrogenating function. The hydrogenating function has been defined above (group VIII elements or a combination of group VI and VIII metals) can be introduced into the catalyst at various points in the preparation and in various manners.

It can be only partly introduced (for example in the case of combinations of group VI and VIII metals) or introduced in its entirety at the moment of mixing the two zeolite types, TON and FAU, with the gel of the oxide which has been selected for the matrix. It can be introduced using one or more ion exchange operations on the calcined support constituted by zeolites with structural types TON and FAU dispersed in the selected matrix, using solutions containing precursor salts of the selected metals when they are from group VIII. It can be introduced by impregnating the formed and calcined support one or more times using a solution of precursors of the group VIII metal oxides (in particular cobalt and nickel) when the group VI metal oxide precursors (in particular molybdenum or tungsten) have previously been introduced on mixing the support. Finally, it can be introduced by means of one or more operations to impregnate the calcined support constituted by zeolites with structural type TON and FAU and the matrix, using solutions containing precursors of group VI and/or VIII metal oxides, precursors of group VIII metal oxides being preferably introduced after those of group VI or at the same time as these latter.

When the elements are introduced by several impregnation steps with the corresponding precursor salts, an intermediate calcining step for the catalyst must be carried out at a temperature which is in the range 250° C. to 600° C.

The total concentration of group VIII and VI metal oxides is in the range 1% to 40% by weight of the catalyst obtained after calcining, preferably in the range 3% to 30% and advantageously in the range 8% to 40%, more preferably 10% to 40% and most preferably 10% to 30%. The ratio between the group VI metal(s) over the group VIII metal(s), expressed as the metal oxides, is in the range 20 to 1.25 by weight, preferably in the range 10 to 2. The catalyst can also contain phosphorous. The phosphorous oxide ($P_2O_5$) concentration is advantageously less than 15%, preferably less than 10% by weight.

Molybdenum impregnation can be facilitated by addition of phosphoric acid to the molybdenum salt solutions.

The catalysts obtained, in their oxide form, can optionally be provided at least partially in the form of the metal or sulphide.

They are loaded into the reactor and used for hydrocracking heavy feeds. They have improved activity over the prior art and further, have improved selectivity for the production of very high quality middle distillates.

The feeds used in the process are, for example, gas oils, vacuum distillates, vacuum gas oils, deasphalted or hydrotreated residues or their equivalents. In general, the feeds have initial boiling points of more than 175° C., advantageously at least 280° C., preferably at least 380° C. Feeds with high N and S contents are preferably hydrotreated in advance. They can be constituted by at least 80% by volume of compounds with boiling points of at least 350° C., preferably between 350° C. and 580° C. (i.e., corresponding to compounds containing at least 15 to 20 carbon atoms). They generally contain heteroatoms such as sulphur and nitrogen.

The nitrogen content is normally in the range 1 to 5000 ppm by weight and the sulphur content is in the range 0.01 to 5% by weight. The hydrocracking conditions, such as temperature, pressure, hydrogen recycle rate, space velocity, can vary widely depending on the nature of the feed, the quality of the desired products, and the facilities available to the refiner.

The temperatures are generally greater than or equal to 230° C. and normally in the range 300° C. to 430° C. The pressure is greater than or equal to 2 MPa and in general over 10 MPa, and less than 30 MPa. The quantity of hydrogen is a minimum of 100 l/l of feed and usually in the range 260 to 3000 liters of hydrogen per liter of feed. The hourly space velocity is general in the range 0.2 to $10h^{-1}$.

The parameters which are of importance to the refiner are the activity and selectivity towards middle distillates. Fixed aims must be achieved under conditions which are compatible with economic reality. Thus the refiner will aim to reduce the temperature, pressure, quantity of hydrogen and maximise the hourly space velocity. It is known that conversion can be improved by raising the temperature, but often to the detriment of selectivity. The selectivity for middle distillates improves with an increase in the pressure or quantity of hydrogen, but this is to the detriment of the process economy. This type of catalyst can be used under conventional operating conditions to achieve selectivities for middle distillates with a boiling point in the range 150° C. to 380° C. of more than 65%, for conversion levels for products with boiling points of less than 380° C. of more than 55% by volume. Under less severe mild hydrocracking conditions, selectivities for middle distillates are more than 65% (and generally more than 75%) for conversion levels of more than 45% or 50%. Further, this catalyst has remarkable stability under these conditions. Finally, because of the composition of the catalyst, it can readily be regenerated.

The following examples illustrate the present invention without in any way limiting its scope.

EXAMPLE 1

Preparation of catalyst C1 (in accordance with the invention)

Preparation of a zeolite of structural type TON

Preparation of a zeolite of structural type TON in its hydrogen form and physico-chemical characteristics of the Y zeolite in its hydrogen form, both in the composition of catalyst C1 of the invention.

The TON type zeolite was prepared using the procedure described in the example describing the preparation of the Nu-10 zeolite with structural type TON in EP-A-0 065 400.

After calcining at 120° C. overnight, a product was obtained which was 15 characterised by its X ray diffraction diagram (Table 1) which is characteristic of a Nu-10 zeolite with structural type TON

| $d_{hkl}$ (Å) | $I/I_0$ |
|---|---|
| 10.90 | 40 |
| 8.82 | 6 |
| 7.02 | 55 |
| 5.45 | 21 |
| 4.59 | 15 |
| 4.38 | 2 |
| 3.70 | 3.5 |
| 3.64 | 5 |
| 3.51 | 6 |
| 3.36 | 13 |
| 3.30 | 7 |
| 2.76 | 2 |
| 2.56 | 20 |
| 2.44 | 7 |
| 2.36 | 2 |
| 1.87 | 20 |

The prepared zeolite with structural type TON then underwent three successive ion exchange steps using ammonium nitrate solutions with a concentration of 10N, and a volume ratio of ammonium nitrate solution to zeolite mass of 10 ml per gram. The residual sodium concentration was then about 65 ppm by weight and the Si/Al atomic ratio of the zeolite was 51.

The physico-chemical characteristics of the Y zeolite which also formed part of the composition of catalyst C1 were as follows:
Global Si/Al molar ratio: 17.5
Framework Si/Al molar ratio (by NMR): 21
Na (ppm by weight): 450
Crystal parameter (X ray diffraction) (Å): 24..27

Preparation of catalyst C1 (in accordance with the invention)

48 grams of zeolite with structural type TON prepared above and 32 grams of H-Y zeolite with the physico-chemical characteristics described above were mixed then ground with 120 grams of type SB3 alumina supplied by Condea. The ground paste was then extruded through a 1.4 mm diameter die. The extrudates were dry impregnated with a solution of a mixture of ammonium heptamolybdate, nickel nitrate and orthophosphoric acid, and finally calcined in air at 550° C. in-situ in the reactor. The concentrations by weight of active oxides were as follows (with respect to the catalyst):

2.5% by weight of phosphorous oxide $P_2O_5$
15% by weight of molybdenum oxide $MoO_3$
5% by weight of nickel oxide NiO The overall zeolite content in the ensemble (matrix+zeolites) was 40% with 24% of TON and 16% of Y zeolite.

The overall zeolite content in the catalyst ensemble was 31% by weight, the concentration of zeolite with structural type TON was 18.6% by weight and that of Y zeolite with structural type faujasite (FAU) was 12.4%.

EXAMPLE 2

Preparation of catalyst C2 (not in accordance with the invention)

A laboratory prepared silica-alumina containing 25% by weight of $SiO_2$ and 75% by weight of $Al_2O_3$ was used. 3% by weight of 67% pure nitric acid (with respect to the dry weight of silica-alumina powder) was added to peptise the powder. After mixing, the paste obtained was extruded through a 1.4 mm diameter die. The extrudates were dry impregnated with a solution of a mixture of ammonium heptamolybdate, nickel nitrate and orthophosphoric acid, and finally calcined in air at 550° C. The concentrations by weight of active oxides were as follows (with respect to the catalyst):

2.5% by weight of phosphorous oxide $P_2O_5$
15% by weight of molybdenum oxide $MoO_3$
5% by weight of nickel oxide NiO

EXAMPLE 3

Preparation of catalyst C3 (not in accordance with the invention)

15.9 grams of H-Y zeolite with the physico-chemical characteristics described in Example 1 were mixed then ground with 84.1 grams of type SB3 alumina supplied by Condéa. The ground paste was then extruded through a 1.4 mm diameter die. The extrudates were dry impregnated with a solution of a mixture of ammonium heptamolybdate, nickel nitrate and orthophosphoric acid, and finally calcined in air at 550° C. in-situ in the reactor. The concentrations by weight of active oxides were as follows (with respect to the catalyst):

2.5% by weight of phosphorous oxide $P_2O_5$
15% by weight of molybdenum oxide $MoO_3$
5% by weight of nickel oxide NiO The concentration of Y zeolite of faujasite type (FAU) was 12.3% by weight. This content was very close to that of catalyst C1 in accordance with the invention.

EXAMPLE 4

Evaluation of catalysts C1, C2 and C3 in a hydrocracking test

Catalysts C1, C2 and C3 prepared as described above were used under hydrocracking conditions with a petroleum feed which had the following characteristics:

| Initial point | 364° C. |
|---|---|
| 10% point | 423° C. |
| 20% point | 446° C. |
| 50% point | 490° C. |
| 90% point | 552° C. |
| end point | 600° C. |
| pour point | +41° C. |

-continued

| density (20/4) | 0.931 |
| sulphur (weight %) | 2.29 |
| nitrogen (ppm by weight) | 1018 |

This feed was first hydrotreated using a NiMoP/Al$_2$O$_3$ catalyst at 385° C., at 25 a total pressure of 14 MPa, a hydrogen flow rate of 1000 liters of gaseous hydrogen per liter of injected feed and an hourly space velocity of 1.0 h$^{-1}$.

The contents by weight of active oxides in the hydrotreatment catalyst were as follows:
3% by weight of phosphorous oxide P$_2$O$_5$
14% by weight of molybdenum oxide MoO$_3$
6% by weight of nickel oxide NiO The entire hydrotreated feed was injected into the hydrocracking test unit which comprised a fixed bed reactor, with an up-flow of feed, into which 80 ml of catalyst had been introduced. Each of the catalysts was sulphurated with a mixture of n-hexane/DMDS+aniline at 320° C. The total pressure was 14 MPa, the hydrogen flow rate was 1000 liters of gaseous hydrogen per liter of injected feed, the hourly space velocity was 1.0 h$^{-1}$.

The catalytic performances were expressed as the temperature at which a gross conversion level of 70% was obtained and by the gross selectivity. These catalytic performances were measured on the catalyst after a stabilisation period, generally at least 48 hours, had passed.
The gross conversion, GC, was taken to be:
GC=weight % of 380 effluents
The gross selectivity GS was taken to be:

$$GS = \frac{(\text{weight of 150/380 effluents})}{\text{weight of 380}^- \text{ effluents}} \times 100$$

| Example no | T (°C.) | GS |
|---|---|---|
| Catalyst C1 (invention) | 355 | 69.3 |
| Catalyst C2 (not inventive) | 415 | 72.5 |
| Catalyst C3 (not inventive) | 365 | 68.3 |

The use of a catalyst in accordance with the invention comprising a zeolite with structural type TON, in this case Nu-10 zeolite, and a Y zeolite of structural type FAU, reduced the gross conversion temperature GC by a substantial amount and a gain of about 60° C. was observed with respect to a silica-alumina based catalyst.

Compared to a catalyst which contained only HY zeolite, the addition of a Nu-10 type zeolite resulted in a substantial gain in activity without sacrificing selectivity.

EXAMPLE 5

Evaluation of catalysts C1, C2 and C3 in a low pressure hydrocracking test

Catalysts C1, C2 and C3 were compared in a low pressure hydrocracking test also known as mild hydrocracking. The feed used for the test was the same as that used in Example 3 but it was not hydrotreated.

The catalytic test unit comprised a fixed bed reactor, with an up-flow of feed, into which 80 ml of catalyst had been introduced. Each of the catalysts was sulphurated with a mixture of n-hexane/DMDS+aniline at 320° C. The total pressure was 5 MPa, the hydrogen flow rate was 500 liters of gaseous hydrogen per liter of injected feed, and the hourly space velocity was 0.5 h$^{-1}$.

The catalytic performances were expressed as the gross conversion obtained at a given temperature (in this case, 410° C.) and by the gross selectivity for 50% gross conversion. These catalytic performances were measured on the catalyst after a stabilisation period, generally at least 48 hours, had passed.
The gross conversion, GC, was taken to be:
GC=% by weight of 380$^-$ effluents
The gross selectivity GS was taken to be:

$$GS = \frac{(\text{weight of 150/380 effluents})}{\text{weight of 380}^- \text{ effluents}} \times 100$$

| Example no | GC at 410° C. | GS at GC = 50% |
|---|---|---|
| Catalyst C1 (invention) | 57.2 | 80.2 |
| Catalyst C2 (not inventive) | 49.0 | 81.1 |
| Catalyst C3 (not inventive) | 54.9 | 78.9 |

The use of a catalyst in accordance with the invention comprising a zeolite with structural type TON, in this case Nu-10 zeolite, and a Y zeolite of structural type FAU produced a gain of about 8% in conversion at 410° C. with respect to a silica-alumina based catalyst.

Compared to a catalyst which contained only HY zeolite, the addition of a Nu-10 type zeolite resulted in a substantial gain in activity without sacrificing selectivity.

We claim:

1. A composition comprising at least one amorphous or low crystallinity matrix, at least one faujasite type zeolite and at least one TON type zeolite selected from the group consisting of Nu-10, THETA-1, KZ-2, or ISI-1.

2. A composition according to claim 1, in which the matrix is selected from the group consisting of: alumina, silica, magnesia, clays, titanium oxide, boron oxide, zirconia, aluminium phosphates, titanium phosphates, zirconium phosphates, and mixtures of at least two of these compounds.

3. A composition according to claim 1, in which the TON type zeolite is NU-10 zeolite.

4. A composition according to claim 1, in which the TON type zeolite is Theta-1 zeolite.

5. A composition according to claim 1, comprising:
10% to 99.9% by weight of at least one matrix;
0.05% to 89.95% by weight of at least one TON type zeolite;
0.05% to 89.95% by weight of at least one faujasite type zeolite.

6. A composition according to claim 1, comprising:
20% to 99.9% by weight of at least one matrix;
0.05% to 79.95% by weight of at least one zeolite with structural type TON;
0.05% to 79.95% by weight of at least one zeolite with structural type faujasite (FAU).

7. A composition according to claim 1, comprising:
29.9% to 99.8% by weight of at least one matrix;
0.1% to 69% by weight of at least one zeolite with structural type TON;
0.1% to 69% by weight of at least one faujasite type zeolite.

8. A catalyst comprising the composition of claim 1 and at least one hydrogenating element.

9. A catalyst according to claim 8, in which the hydrogenating element is an element from group VIII.

10. A catalyst according to claim 8, containing at least one element from group VIII and at least one element from group VI as the hydrogenating elements.

11. A catalyst according to claim 8, prepared by mixing the matrix and zeolites, then forming and introducing the hydrogenating element.

12. A catalyst according to claim 8, further comprising less than 15% by weight of phosphorous oxide $P_2O_5$.

13. A process for hydrocracking petroleum feeds by contacting the feeds with a catalyst according to claim 8 at a temperature of at least 230° C., a pressure of at least 2 MPa, with an hourly space velocity of 0.2 to 10 $h^{-1}$.

14. A process according to claim 13, in which the feeds are constituted by at least 80% by volume of compounds with an initial boiling point of at least 350° C., a nitrogen content which is in the range 1 to 5000 ppm, and a sulphur content which is in the range 0.01% to 5% by weight.

15. A process according to claim 13, in which the feed is hydrotreated before undergoing hydrocracking.

* * * * *